(12) United States Patent
Sartipizadeh et al.

(10) Patent No.: US 12,519,314 B2
(45) Date of Patent: Jan. 6, 2026

(54) CONTROL OF BI-DIRECTIONAL POWER TRANSFER

(71) Applicant: FORD GLOBAL TECHNOLOGIES, LLC, Dearborn, MI (US)

(72) Inventors: Hossein Sartipizadeh, Centennial, CO (US); Ahmadreza Mahmoudzadeh, League City, TX (US); Mahmood Tabesh, Northville, MI (US); Ryan O'Gorman, Beverly Hills, MI (US); Xiaowu Zhang, Novi, MI (US); Chen Zhang, South Lyon, MI (US); Yan Fu, Bloomfield Hills, MI (US); Sunil Goyal, Canton, MI (US); David Mccreadie, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/738,662

(22) Filed: Jun. 10, 2024

(65) Prior Publication Data

US 2025/0379446 A1 Dec. 11, 2025

(51) Int. Cl.
| | |
|---|---|
| H02J 3/28 | (2006.01) |
| B60L 53/60 | (2019.01) |
| B60L 55/00 | (2019.01) |
| G06Q 50/06 | (2012.01) |
| H02J 3/32 | (2006.01) |
| H02J 7/00 | (2006.01) |

(52) U.S. Cl.
CPC ............ *H02J 3/322* (2020.01); *B60L 53/60* (2019.02); *B60L 55/00* (2019.02); *G06Q 50/06* (2013.01); *H02J 7/00712* (2020.01)

(58) Field of Classification Search
CPC .......... B60L 55/00; B60L 53/00; B60L 53/60; B60L 53/62; B60L 53/63; B60L 53/64; H02J 3/28; H02J 3/32; H02J 3/322; H02J 7/00; H02J 7/007; H02J 7/00712
USPC ................................ 307/11, 16, 17, 19, 20
See application file for complete search history.

(56) References Cited

U.S. PATENT DOCUMENTS

| | | | |
|---|---|---|---|
| 11,173,804 B2 * | 11/2021 | Tsubokura | B60L 55/00 |
| 11,685,282 B2 | 6/2023 | Harirchi et al. | |
| 12,019,415 B2 * | 6/2024 | Lu | G05B 19/042 |
| 2023/0406147 A1 | 12/2023 | Harirchi et al. | |

FOREIGN PATENT DOCUMENTS

CN    103280822 A    9/2013

* cited by examiner

*Primary Examiner* — Hai L Nguyen
(74) *Attorney, Agent, or Firm* — David B. Kelley; Brooks Kushman P.C.

(57) ABSTRACT

One or more controllers, responsive to an amount of power transferred from a traction battery of a vehicle to a utility grid during a planning period exceeding a predefined kWh amount that is greater than a kWh capacity of the traction battery, inhibit further transfer of power from the traction battery to the utility grid for a remainder of the planning period.

13 Claims, 8 Drawing Sheets

CONTROL OF BI-DIRECTIONAL POWER TRANSFER

TECHNICAL FIELD

The present disclosure generally relates to a method and system for controlling bi-directional power transfer between an electric vehicle and a power entity.

BACKGROUND

An electrified vehicle may be provided with a traction battery configured to provide power for not only propelling the vehicle, but also supplying power to one or more external entities. The electrified vehicle may be connected to a home energy ecosystem (HEE), which may include energy storage devices such as home energy storage (HES). The stored electricity may be used to power various devices such as appliances, AC systems and other devices. Operation of the HEE may be controlled via a home energy management system (HEMS).

SUMMARY

A home energy system includes one or more controllers that, responsive to an amount of power transferred from a traction battery of a vehicle to a utility grid during a planning period exceeding a predefined kWh amount that is greater than a kWh capacity of the traction battery, inhibit further transfer of power from the traction battery to the utility grid for a remainder of the planning period.

A method includes, during a planning period, commanding discharge of power from a traction battery of a vehicle to a utility grid, and after a kWh amount of the power exceeds a predefined threshold that is greater than a kWh capacity of the traction battery, inhibiting further discharge of the traction battery to the utility grid for a remainder of the planning period.

A home energy system includes one or more controllers that command transfer of power from a traction battery of a vehicle to a utility grid during a planning period provided a utility price associated with the utility grid is greater than a predefined value, and inhibit further discharge of the traction battery to the utility grid for a remainder of the planning period after a predefined kWh amount of power exceeds a predefined threshold.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a method and system for controlling bi-directional electric power transfer between a vehicle and an external entity. More specifically, the present disclosure proposes a method and system for controlling bi-directional electric power transfer between a vehicle and a grid based on various factors such as energy price and grid demand.

Figure 1:
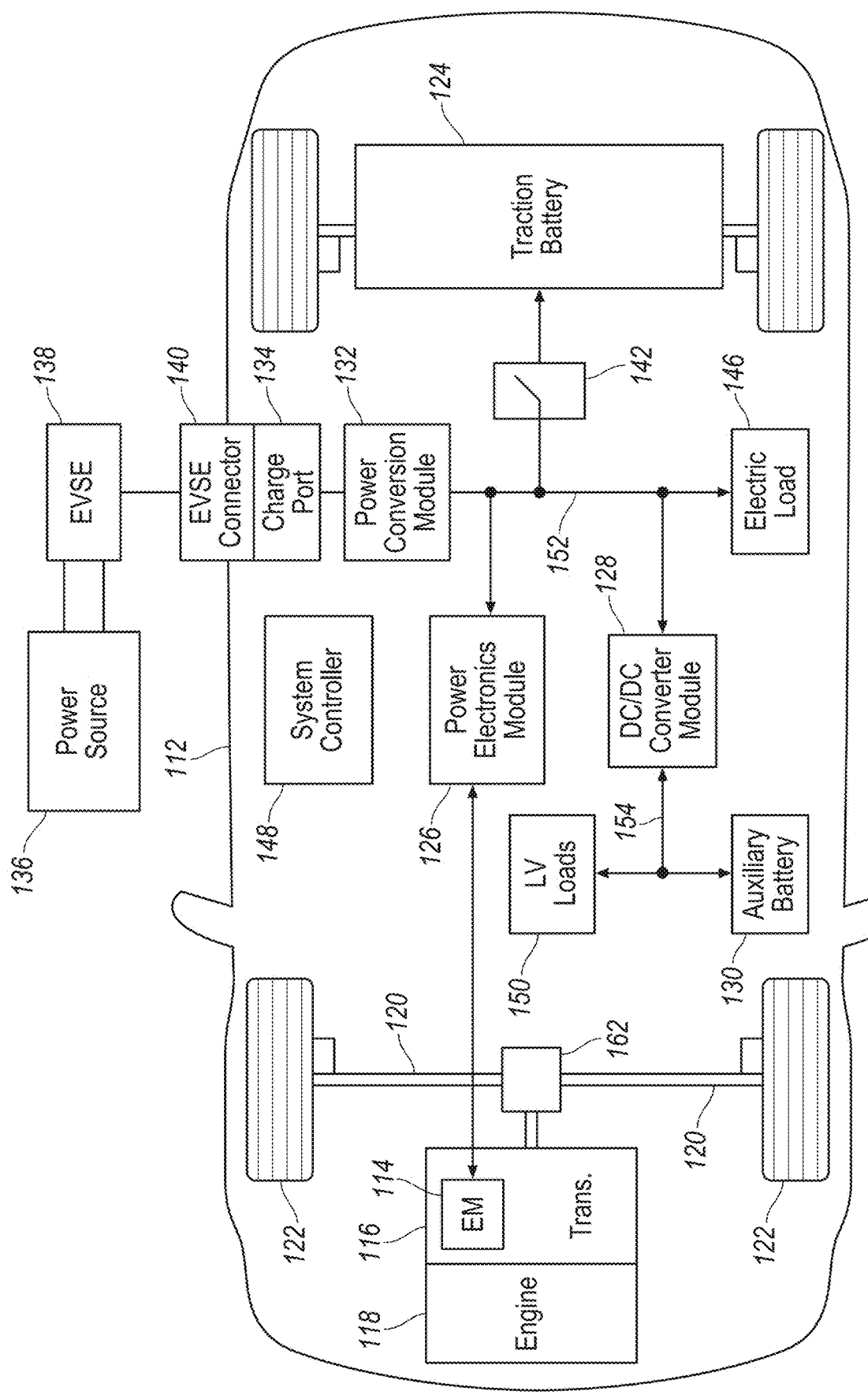
FIG. 1 illustrates a diagram of an electrified vehicle illustrating drivetrain and energy storage components including an electric machine.

FIG. 1 depicts an electrified vehicle 112 that may be referred to as a plug-in hybrid-electric vehicle. The plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. The electrified vehicle 112 may also be a battery electric vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the vehicle 112 may be configured to provide electric power from the traction battery 124 to off-board power storage and/or a power grid (not shown) via the EVSE 138 and EVSE connection 140 under the control of controllers such as the power conversion module 132 or one or more remote controllers such as a cloud server (not shown). Alternatively, the power transfer from the traction battery 124 to the off-board load (e.g., the HES) may be performed without utilizing the power conversion module 132 since both the traction battery 124 and the HES are DC. Transfer from the traction battery 124 to the power grid may require utilizing the power conversion module 132 as the power grid may be AC power only. The traction battery 124 may be directly connected to the charge port to transfer and/or receive DC power. For instance, the EVSE 138 may be integrated or associated with a home having a HES as a power backup. The vehicle 112 may be operated as a portable power storage to transfer power from and to the HES coordinated by a HEMS (described in detail below).

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may connect to any electronic module that is present in the vehicle 112. A vehicle system controller (VSC) 148 may be present to coordinate the operation of the various components.

Figure 2:
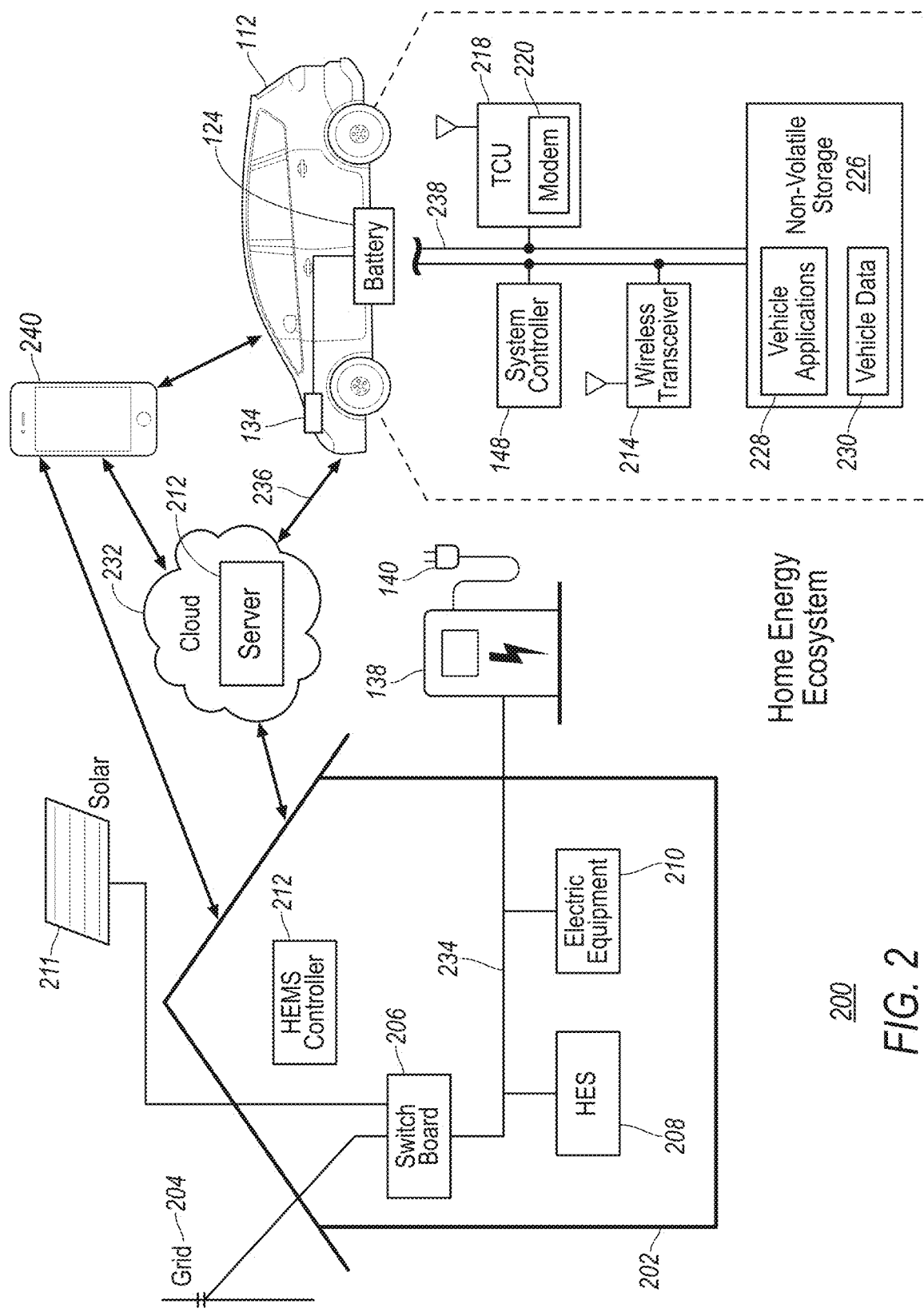
FIG. 2 illustrates a diagram of a HEMS associated with an electric vehicle.

FIG. 2 depicts a diagram of a home energy management system associated with an electric vehicle. A HEE 200 in the present example may be implemented for a house/building 202. The house 202 may access electric power from a power grid 204 via a switch board 206 configured to provide various components of the HEE 200 with electric power via an internal powerline 234. For instance, the HEE 200 may include one or more electric equipment 210 (e.g., appliance) configured to consume electricity and provide various features to the household. The HEE 200 may further include a HES 208 configured to store electric energy. The HES 208 may be implemented in various forms. As an example, the HES 208 may include a rechargeable battery (e.g., lithium-ion battery) to store electric energy received from the grid 204 (or other sources) and to provide the electric energy to the internal powerline 234 whenever needed. Since the electric energy may be stored as DC power in the HES 208, one or more DC/AC inverters may be provided with the HES 208 for power transitions. The house 202 may be further connected to a solar panel 211 via the switch board 206. The solar panel 211 may be configured to generate and supply electric power to the HES 208 via the internal power line 234. The solar panel 211 may generate a DC electric power having a voltage that is the same or different from the voltage of the HES 208. In one example, the solar panel 211 may be configured to charge the HES 208 via one or more DC/DC converters. Alternatively, one or more DC/AC inverters may be provided with the solar panel 211 and/or the switch board for power transitions. It is noted that although the solar panel 211 is provided to the house 202 for electric power generating in the present embodiment, the present disclosure is not limited thereto. In other examples, the house 202 may be provided with other means of power generating capabilities such as a wind turbine or the like.

With continuing reference to FIG. 1, the internal powerline 234 may be further connected to the EVSE 138 configured to transfer electric energy with the electric vehicle 112. The EVSE 138 may be installed within or near the house 202 (e.g., in a garage) and adapted to a home electric energy configuration having a predefined voltage and maximum current supported by the switch board 206. As discussed with reference to FIG. 1, the EVSE 138 may be configured to connect to the vehicle 112 via the charge port 134 to charge the traction battery 124. Additionally, the EVSE 138 may be further configured to draw electric power from the traction battery 124 to supply power to the HEE 200 or the grid 204. For instance, the EVSE 138 may be configured to draw electric power from the vehicle 112 and the HES 208 to power components of the house 202 during peak hours when the electricity price is high to avoid paying a premium to the utility company.

The power management of the HEE 200 may be controlled and coordinated by a HEMS controller 212 associated with the house 202. The HEMS controller 212 may be implemented in various manners. For instance, the HEMS controller 212 may be a dedicated controller located within the house 202 and connected to components of the home energy ecosystem or smart home devices HEE 200 via wired or wireless connections (not shown). Alternatively, the HEMS controller 212 may be remotely implemented via a cloud server 232 through the Internet and configured to remotely monitor and control the operations of components of the HEE 200. In any or all of the above implementation examples, the HEMS controller 212 may be provided with software to monitor and control the operations of the various components of the home energy ecosystem HEE 200. The HEMS controller 212 may be further provided with an interface associated with input and output devices to interact with a user of the HEE 200. The HEMS 212 may be further connected to a cloud 232 via a public or private network to communicate with other entities such as the utility company to facilitate the planning and controlling of the HEE 200. For instance, the HEMS 212 may be configured to operate the charging and discharging of the HES 208 and battery 124 based on the current and/or predicted utility rate/price received from an entity (e.g., utility company) via the cloud 232. In one example, the HEMS controller 212 may be implemented via the cloud server 232 through software without dedicated hardware structure for the house 202. It is noted that the term cloud 232 recited in the present disclosure is used as a general term and may include any computing network involving carriers, router, computers, controllers, circuitries, servers or the like configured to store data and perform data processing functions and facilitate communication between various entities.

With continuing reference to FIG. 1, the vehicle 112 may further include various components to facilitate the power transaction between the battery 124, the house 202, and the grid 204. The vehicle 112 may include a system controller 148 configured to perform instructions, commands, and other routines in support of the processes described herein. For instance, the system controller 148 may include one or more processors and be configured to execute instructions of vehicle application 228 to provide features such as wireless communication and power management. Such instructions and other data may be maintained in a non-volatile manner using a variety of computer-readable storage medium 226 as a part of vehicle applications 228 and vehicle data 230. The computer-readable medium 226 (also referred to as a processor-readable medium or storage) may include any non-transitory medium (e.g., tangible medium) that participates in providing instructions or other data that may be used by the system controller 148. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The vehicle 112 may be further configured to wirelessly communicate with a variety of digital entities via a wireless transceiver 214. For instance, the vehicle 112 may be configured to communicate with the HEMS controller 212 (local or remote) via the wireless transceiver 214 to perform various operations. Additionally or alternatively, communication between the vehicle 112 and the HEMS controller may be enabled by the EVSE connector 140 coupled with the charge port 134 configured to support digital communication protocols. The wireless transceiver 214 may be configured to support a variety of wireless communication protocols enabled by wireless controllers (not shown) in communication with the wireless transceiver 214. As a few non-limiting examples, the wireless controllers may include a Wi-Fi controller, a Bluetooth controller, a radio-frequency identification (RFID) controller, a near-field communication (NFC) controller, and other devices such as a Zigbee transceiver, an IrDA transceiver, an ultra-wide band (UWB) transceiver, or the like.

The vehicle 112 may be further provided with a telematics control unit (TCU) 218 configured to control telecommunication between the vehicle 112 and the cloud 232 through a wireless connection 236 using a modem 220. The wireless connection 236 may be in the form of various communication networks (e.g., cellular network). Through the wireless connection 236, the vehicle 112 may access one or more servers 213 of the cloud 232 to access various content for various purposes. The various components of the vehicle 112 introduced above may be connected to each other via in-vehicle network 238. The in-vehicle network 238 may include, but is not limited to, one or more of a CAN, an Ethernet network, and a media-oriented system transport (MOST), as some examples.

The HEE 200 may be further provided with a mobile device 240 associated with a user and configured to interact with various entities. As a few non-limiting examples, the mobile device 240 may include a smartphone, a tablet computer, laptop computer, a smart watch, and/or any digital entities provided with data communication and processing capabilities. The user may interact with the HEE 200 via the mobile device 240. For instance, the user may provide user input to the HEMS controller 212 via the mobile device 240 through a wireless connection. Additionally, the mobile device 240 may be configured to communicate with the server 212 and/or the vehicle 112 to enable various functions.

Figure 3:
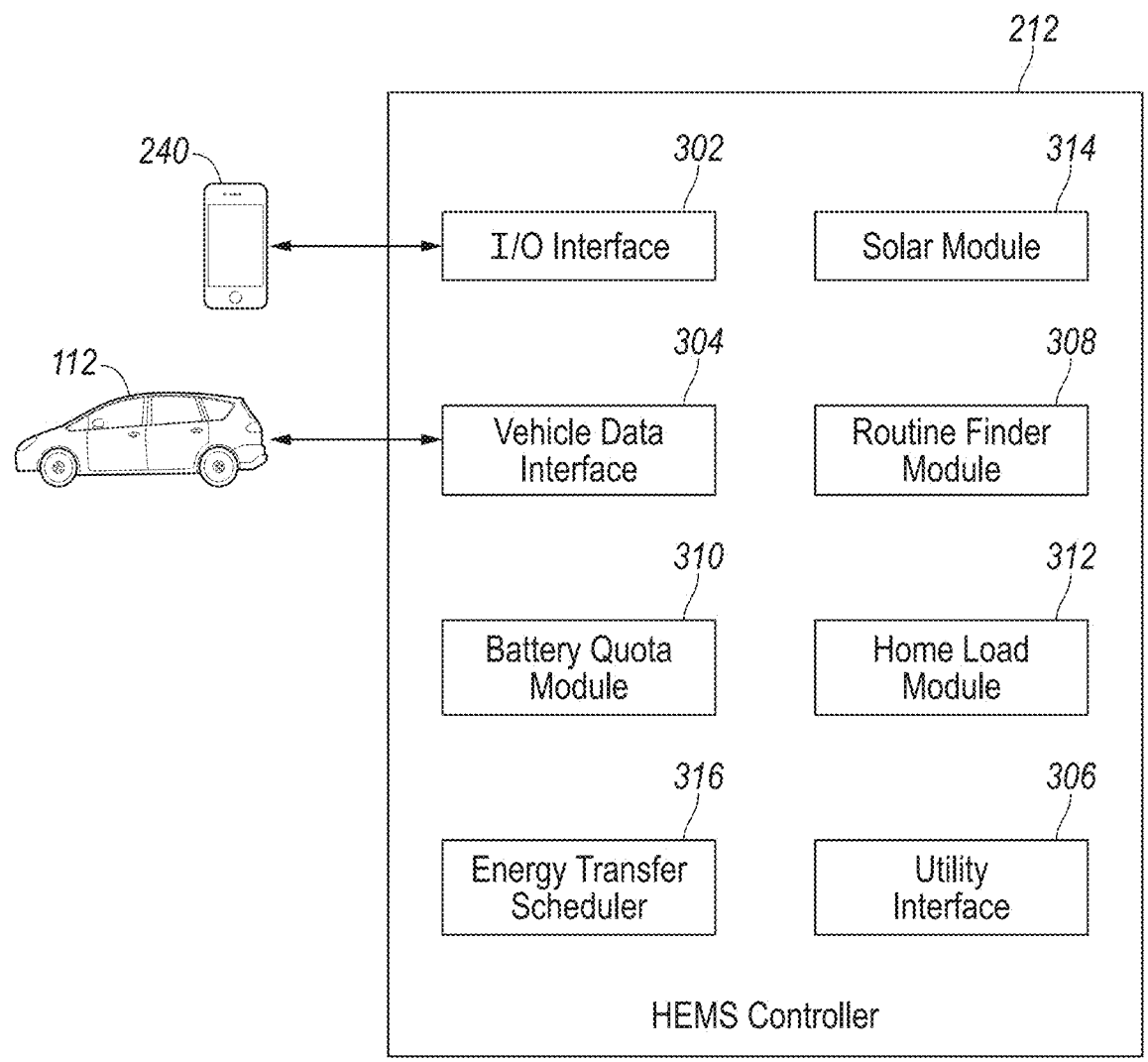
FIG. 3 illustrates a block diagram of a HEMS controller.

The HEMS controller 212 may be configured to control and coordinate the energy distribution of the house 202 based on various factors. More specifically, the HEMS controller 212 may be provided with a variety of modules configured to interact with different entities and process data parameters accordingly. Referring to FIG. 3, a block diagram of an example of the HEMS controller 212 of one embodiment of the present disclosure is illustrated. With continuing reference to FIGS. 1 and 2, the HEMS controller 212 may be provided with various components to perform various operations in the present example. For instance, the HEMS controller 212 may be provided with an I/O 302 interface configured to communicate with one or more users. In one example, the I/O interface 302 may be provided with one or more touchscreens or buttons configured to directly receive manual input by the user. Alternatively, the I/O interface 302 may be provided with wired and/or wireless communication capabilities to communicate with one or more digital entities such as the mobile device 240, the server 212, and/or the vehicle 112 to receive user input settings.

The user may provide various input settings to the HEMS controller 212. For instance, the user may provide one or more utility plans and desired settings via the I/O interface 302. The desired settings may include a state of charge (SOC) range indicative of a reserved lower SOC limit (e.g., 30%) that no transfer energy below this level is allowed, and a maximum SOC limit (e.g., 90%) that no charging above this level is allowed unless in special circumstances such as an anticipated long trip. The desired setting may further include a vehicle departure time indicative of a predicted time that the vehicle 112 will be disconnected from the EVSE 138 and depart from the HEE 200.

The HEMS controller 212 may be further provided with a vehicle data interface 304 configure to communicate with the vehicle 112 and receive vehicle data therefrom. As discussed above, the vehicle data interface 304 may be configured to communicate with the vehicle 112 in a wireless manner via the wireless transceiver 214. Additionally or alternatively, the vehicle data interface 304 may receive the vehicle data via the charger data connection when the vehicle 112 is connected to the EVSE 138. Additionally or alternatively, the vehicle data interface 304 may receive the vehicle data from the cloud 232. The vehicle data may include various entries and parameters related to the traction battery 124. For instance, the vehicle data may include SOC, temperature, state of health (SOH), charging cycles, and/or an amount of energy charge/discharge of the traction battery 124 within a time period (e.g., one week).

The HEMS controller 212 may be further provided with a utility interface 306 configured to communicate with a utility provider and receive utility information. The utility information may include one or more utility rates from the utility provider. In one example, the utility rate may be a variable rate depending on day of the week and time of day. In general, the utility rate during peak hours may be higher than the rate during off-peak hours. The utility rate may include both the buying rate (e.g., electricity from the grid to the HEE) and selling rate (e.g., electricity from the HEE to the grid). The buying rate and the selling rate may be the same in some cases. Alternatively in other cases, the buying rate and the selling rate may be different.

The utility information may further include one or more grid requirements associated with the grid 204 to which the HEE 200 is connected. The grid requirements may include various entries. As a few non limiting examples, the grid requirements may include a not charging time working indicative of a time period during which the user is advised to refrain from charging the vehicle 112 using electric power from the grid (e.g., during peak hours). The grid requirements may further include a slow charging time window indicative of a time period during which the user is advised to only charge the vehicle 112 within a specified lower charging power. The lower charging power may also be specified in the grid requirements. The grid requirements may further include a recommended discharging time window indicative of a time period during which the user is advised to supply electric power from the vehicle 112 and/or the HES 208 to the grid 204.

The HEMS controller 212 may be further provided with a routine finder module 308 configured to determine and predict one or more actions performed by the vehicle 112 as a part of the vehicle routine. The routine finder module 308 may be configured to use historical data and/or user departure time input to predict one or more vehicle trips and parking time and location. The energy consumption associated with the trips may also be predicted to facilitate the energy transaction.

The HEMS controller 112 may be further provided with a battery quota module 310 configured to determine the usage of the traction battery 124 based on the vehicle data. The battery quota module 310 may communicate the battery specification including battery capacity, energy transfer hardware loss, and/or battery SOH with the vehicle 112. Based on the specification, the battery quota module 310 may estimate and/or suggest a maximum monthly (or weekly, daily or the like) power transfer limit that considers the power transfer in both directions to maximize the power transaction while preventing an over-usage of traction battery 124.

The HEMS controller 112 may be further provided with a home load module 312 configure to predict a power usage of the house 202. The home load module 312 may be configured to predict the power usage of the house 202 and the energy level of the HES 208 for a predefined time period (e.g., one day) based on the historical usage data.

The HEMS controller 112 may be further provided with a solar module 314 in communication with the solar panel 211 and configured to integrate the solar energy (as well as other green energy) into the calculation. The solar module 314 may receive weather reports from the cloud 232 to predict one or more energy generating events (e.g., sunny weather) including an energy generating power and a duration. Energy generated by the predicted generating event may be used to compensate some of the home load as predicted by the home load module 312 and/or be stored in the HES 208 for future use (e.g., during the peak hour).

The HEMS controller 112 may be further provided with an energy transfer scheduler 316 configured to combine the various data and/or information received from the components/modules described above and schedule the power transaction between the vehicle 112 and the grid 204 via the HEE 200. For instance, the energy transfer scheduler 316 may generate a schedule to charge the vehicle 112 during off-peak hours when the utility rate is cheaper and supply the electric power from the vehicle 112 to the grid when the utility rate is higher while complying with the various energy transfer conditions.

The energy transfer scheduler 316 may generate the schedule and operate the vehicle charging/discharge based on various conditions. For instance, the energy transfer conditions may include an SOC condition indicative of a range defined by the reserved lower SOC and the maximum SOC. The energy transfer scheduler 316 propagates the SOC at a given time t by considering factors such as the SOC at the previous time, the accumulated energy from charging at time t, the consumed energy from discharging at time t, and/or the energy consumption at time t.

The energy transfer conditions may further include a time and location condition on charging and discharging decisions. These time and location conditions may specify the time and/or locations in which the battery charging and discharging may be performed. For instance, the power transfer may be triggered when the vehicle 112 is parked at one or more designated locations (e.g., the HEE 200), and the charging/discharging times may be restricted based on the time.

The energy transfer conditions may further include a maximum transfer amount corresponding to the SOH condition of the traction battery 124. The maximum transfer amount may be specified to cover a total amount of energy transfer to and from the traction battery 124 for a predefined time period (e.g., one week). The energy transfer scheduler 316 may determine the present vehicle transfer amount via the vehicle data each day.

The energy transfer conditions may further include a reality condition that may be used to enable fractional charging and discharging and based on the predicted energy consumption at one or more arrival times. Further, the reality condition may be used to avoid non-profitable charging and discharging events to increase the profitability of the energy transfer. A discharge from the traction battery 124 may be unprofitable when the utility rate is low (e.g., off-peak hours) and a charge of the traction battery 124 may be unprofitable when the utility rate is high (e.g., peak hours). In addition, the HEMS 212 may further take the energy loss during the power transfer into account to decide the power transfer between various entities. For instance, up to 10% energy may be lost during the transfer due to factors such as the electrical resistance associated with the power cable. The energy loss may be used for determining the profitability of the power transactions.

The energy transfer conditions may further include a feasibility condition that may be used to identify and avoid an overlap between charging and discharging sessions. In some cases, the HEMS 212 may override the one or more conditions to adapt to various situations. For instance, in response to predicting a long trip requiring a large amount of energy, the HEMS 212 may override the maximum SOC (e.g., 90%) and charge the traction battery 124 all the way to 100%.

Figure 4:
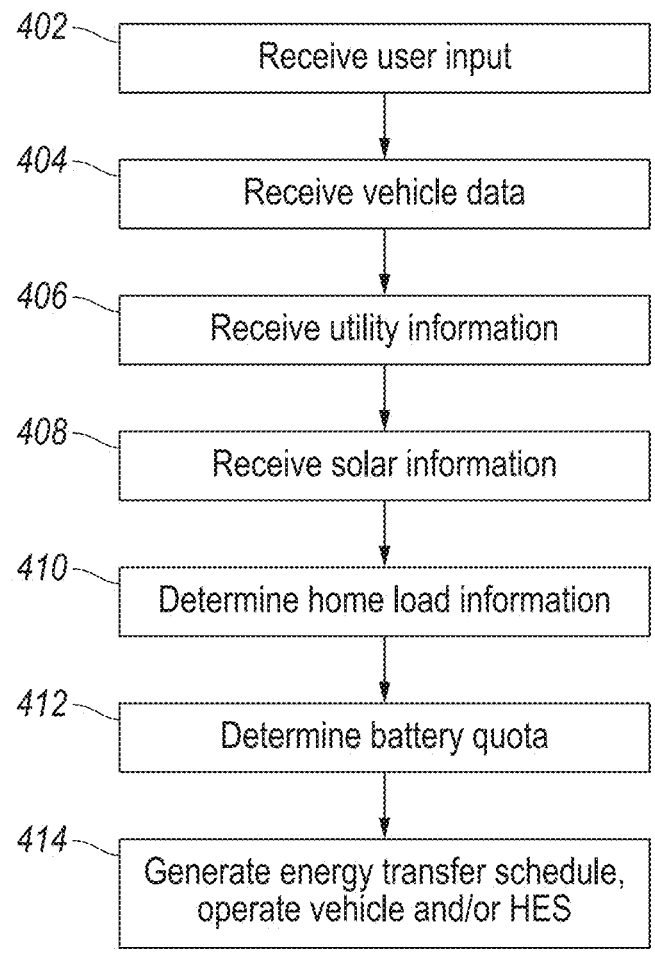
FIG. 4 illustrates a flow diagram of a process for scheduling the energy transfer between a vehicle and grid.

Referring to FIG. 4, an example flow diagram of a process 400 for scheduling the energy transaction between the vehicle 112 and the grid 204 of one embodiment of the present disclosure is illustrated. With continuing reference to FIGS. 1 to 3, operations of the process 400 may be individually or collectively implemented via the HEMS controller 212 as well as various components of the HEE 200. For simplicity, the following description will be made primarily with reference to the HEMS controller 212. At operation 402, the HEMS controller 212 receives a user input (e.g., via the I/O interface) indicative of one or more preferred and/or required user conditions for the vehicle 112. The user input may include any data/information related to the operation of the traction battery 124 as well as the HES 208. For instance, the user condition may include a battery SOC range defined by the reserved lower SOC and the maximum SOC based on the user's personal preference. The user input may further include a planned trip or usage of the vehicle in a future time. The user input may further include a vehicle setting such as a heating, ventilation, and air conditioning (HVAC) setting which may affect the energy usage of the traction battery 124. For instance, a lower preferred cabin temperature in the summer may increase the power consumption of the vehicle 112. The user input may further include an energy planning period indicative of how long the HEMS 212 may plan ahead for the bidirectional power transfer. For instance, if the energy planning period is set to one week (i.e., seven days), the HEMS 212 may obtain and receive information that is sufficient for the one-week planning.

At operation 404, the HEMS controller 212 receives vehicle data (e.g., via the vehicle data interface 304) indicative of various entries and parameters related to the condition the vehicle 112. For instance, the vehicle data may include the SOC, temperature, SOH, charging cycles, an amount of charge/discharge for the traction battery 124 within a time period, or the like.

At operation 406, the HEMS controller 212 receives utility information (e.g., via the utility interface 306). The utility information may include various data entries related to the utility supply such as the utility rate, peak hour, anticipated outages (if applicable), electric grid condition and requirements, or the like.

At operation 408, the HEMS controller 212 receives solar information (e.g., via the solar module 314). The solar information may include various data entries related to the operation of the solar panel as well as other green energy sources if provided. For instance, the solar information may include a weather report from the cloud 232 to predict one or more energy generating events.

At operation 410, the HEMS controller 212 determines a home load (e.g., via the home load module 312) for the energy planning period. The home load may be determined based on historical data. Additionally or alternatively, the home load may be determined via the weather report. For instance, in response to high temperature during the energy planning period in the summer, the HEMS controller 212 may predict a higher amount of HVAC usage resulting in higher home loads.

At operation 412, the HEMS controller 212 determines a battery quota indicative of a power transfer limit for the traction battery 124 of the vehicle 112 during the energy planning period (e.g., via the battery quota module 310). The battery quota may be determined in various manners. In one example, the battery quota may be manually input by the vehicle user through user input. The user input may include a total amount of charge and discharge limit for the energy planning period. Additionally or alternatively, the user may be allowed to specify an energy quota for one or more specific operations. As an example, the user input may specify the energy for non-propulsion discharge only, without limiting discharge for propulsion when the vehicle is being driven. Alternatively, the HEMS controller 212 may automatically determine the battery quota based on the vehicle data (e.g., SOH) without relying on the user input.

At operation 414, the HEMS controller 212 generates the energy transfer schedule (e.g., using the energy transfer scheduler 316) based on the data discussed above (in addition to other data such as the vehicle routine from the routine finder module 308) and performs operations to the traction battery 124 and/or the HES 208 to implement the schedule.

Figure 5:
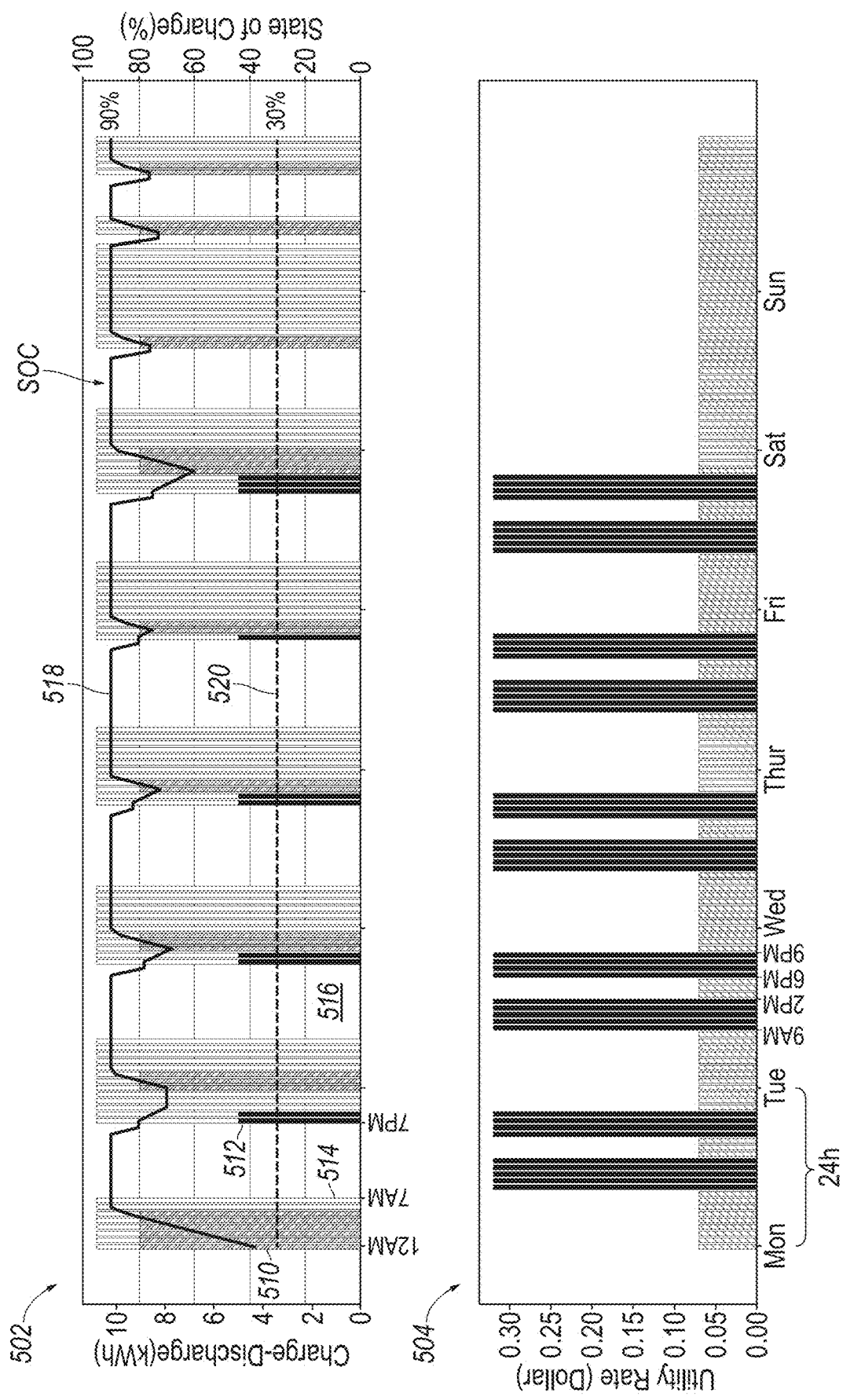
FIGS. 5-8 illustrate bar charts of bi-directional energy transfer sessions.

The operations of the process 400 may be applied to various examples. Referring to FIG. 5, bar charts of bidirectional energy transfer of the traction battery 124 of one example of the present disclosure are illustrated. With continuing reference to FIGS. 1 to 4, FIG. 5 illustrates two bar charts 502, 504 that corresponding to each other in time. More specifically, the horizontal axis of both bar charts 502, 504 denotes time with each bar representing a one-hour interval. In the present example, the energy planning period is one week (i.e., seven days) and therefore a total time span of seven days is illustrated.

The vertical axis of the top bar chart 502 denotes a charging/discharging power performed by the traction battery 124 of the vehicle 112 in units of kW. The charging and discharging operations are differentiated by different patterns. For instance, bars with a first pattern 510 indicate the traction battery 124 is being charged (e.g., drawing power from the grid) and bars with a second pattern 512 indicate the traction battery 124 is being discharged (e.g., supplying power to the grid). Bars with a third pattern 514 indicate the vehicle 112 is connected to the HEE 200 but no charging or discharging activities are performed. Empty spaces 516 with no bar present indicate the vehicle 112 is not connected to the HEE 200 in situations such as the vehicle being driven away and/or parked somewhere else. Also presented in the top bar chart 502 is the SOC of the traction battery 124 in units of percentage. In the present example, the user may limit the SOC with a range between a reserved lower SOC 520 of 30% and a maximum SOC 518 of 90%.

The vertical axis of the lower bar chart 504 denotes the utility rate in units of dollars per kWh. In the present example, the utility rate is 32 dollars/kWh for the peak hours and 7 dollars/kWh for off-peak hours. The peak hours are from 9 AM to 2 PM and 5 PM to 9 PM during working days (Monday to Friday) and the rest are off-peak hours.

In the present example, the total capacity of the traction battery 124 is 98 kWh, the maximum charging power is 9 kW and the maximum discharging power is 5 kW. The goal of the energy transfer schedule is to minimize the overall home energy bill by powering the home/grid during peak hours while satisfying one or more energy transfer conditions including that the weekly energy transfer from vehicle to home/grid does not exceed 50 kWh (e.g., as a part of the battery quota). The energy transfer conditions further include refraining from charging for Monday from 9 PM to 11:59 PM (e.g., as a part of the grid requirement). The energy transfer conditions further aim to maximize the SOC in the last time index.

With the above conditions determined, the HEMS controller 212 schedules and performs the energy transfer between the vehicle 112 and the HEE 200 as illustrated in the top bar chart 502. More specifically, the battery charging starts at 11 PM on Sunday when the battery SOC is around 40% until the SOC reaches the maximum SOC of 90% at 5 AM on Monday morning when the charging stops. At around Monday 7 AM, the vehicle 112 is disconnected from HEE 200 (e.g., driven to work).

At around Monday 7 PM, the vehicle 112 returns to the HEE 200 and is reconnected to the HEE 200 at approximately 80% SOC. Since the SOC is above the reserved lower limit (e.g., 30%) and the battery quota has not been met, the HEMS controller 212 controls and operates the traction battery 124 to discharge supplying electric energy to the house 202 and/or to the grid 204 during the peak hours when the utility rate is high. The discharge power is limited to 5 kW as discussed above. At 9 PM, the HEMS 212 stops discharging the traction battery 124 as the peak hour has passed. Due to the grid requirement, the HEMS 212 does not immediately control the traction battery 124 to start recharging until 12 AM Tuesday (e.g., after the period specified in the grid requirement) when the recharging starts.

The process repeats in a substantially similar manner throughout the rest of the week. In the present example, the battery 124 meets the battery quota (e.g., 50 kWh discharge limit) on Friday evening at around 9 PM and no more discharge is allowed for the rest of the energy planning period. Since the utility price is low over the weekend (e.g., Saturday and Sunday), the battery 124 may be charged freely after Friday until the next cycle starts.

Figure 6:
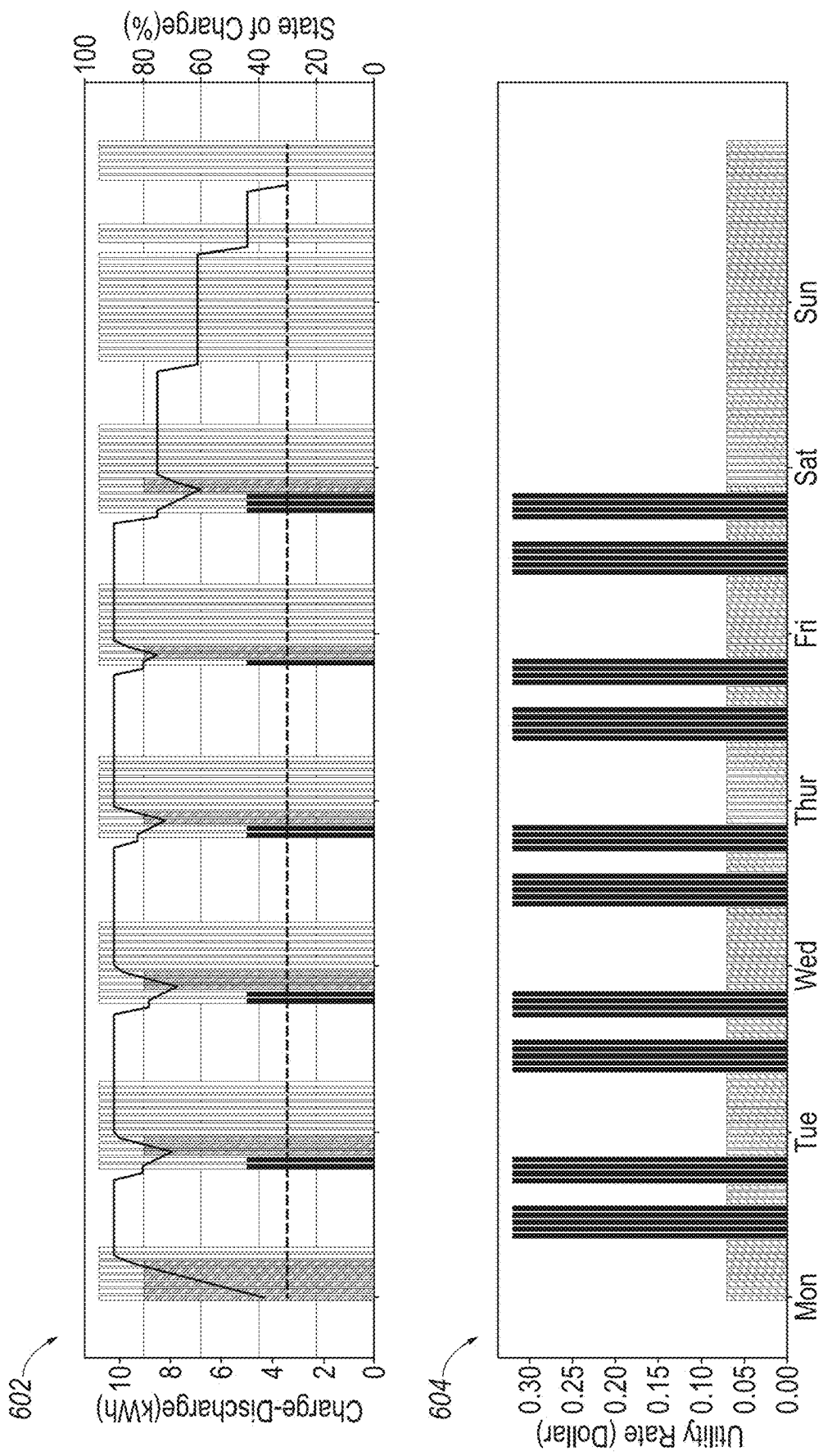

Referring to FIG. 6, bar charts 602, 604 of bi-directional energy transfer of the traction battery 124 of another example of the present disclosure are illustrated. The power transfer conditions of the present example are mostly the same as those discussed above with reference to FIG. 5, except there is no grid requirement on Monday night, and the predicted SOC is set to be equal to the reserved lower limit (e.g., 30%) in the last days of the energy planning period (e.g., Sunday). Therefore, the HEMS 212 operates the traction battery 124 to only allow for charging as much as necessary as the time approaches the end of the energy transfer period.

Figure 7:
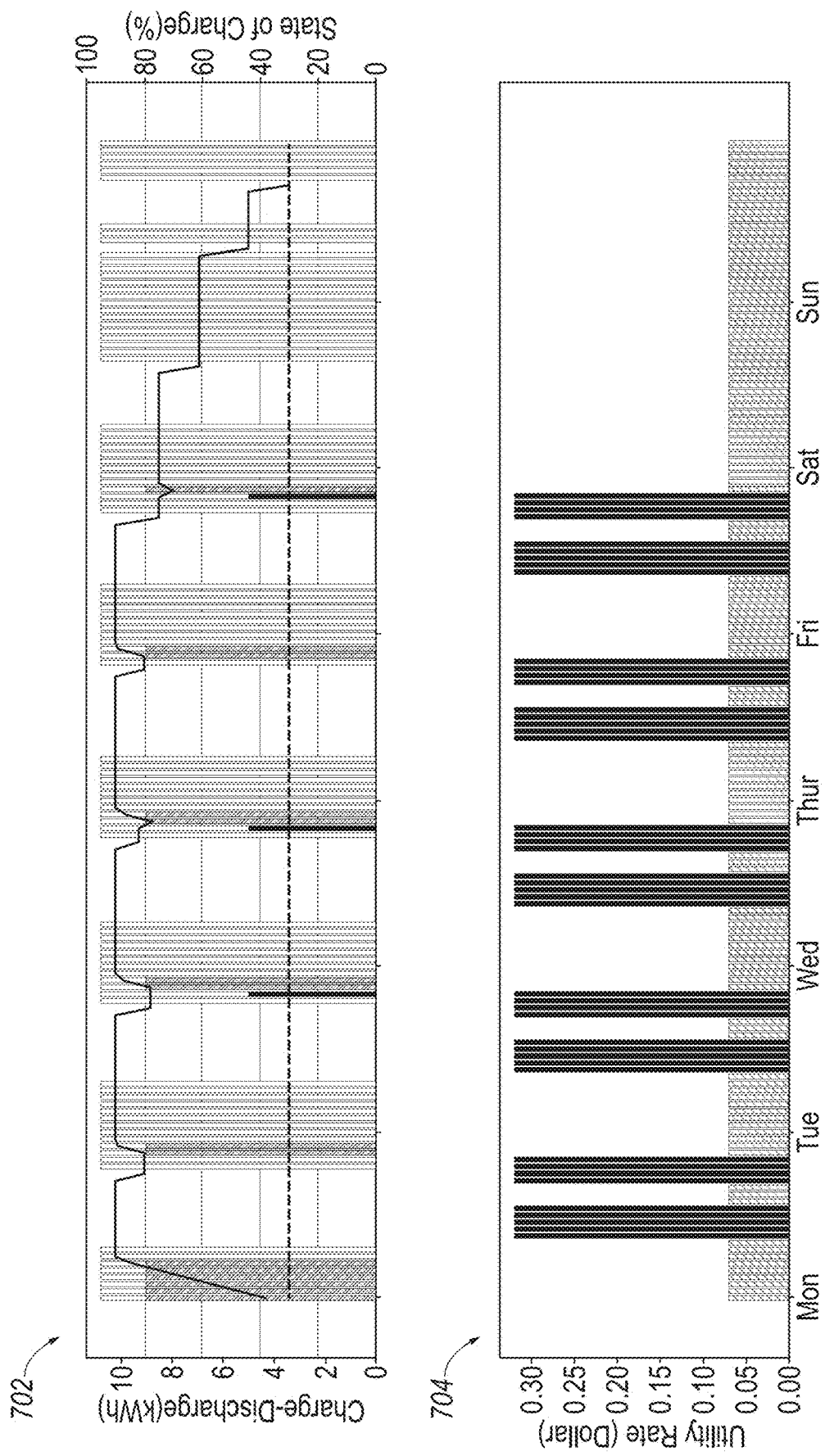

Referring to FIG. 7, bar charts 702, 704 of bi-directional energy transfer of the traction battery 124 of another example of the present disclosure are illustrated. The power transfer conditions of the present example are mostly the same as those discussed above with reference to FIG. 6, except that the battery quota specifies a 15 kWh discharge amount instead of 50 kWh. Due to the reduced discharge amount, only three discharge sessions are performed.

Figure 8:
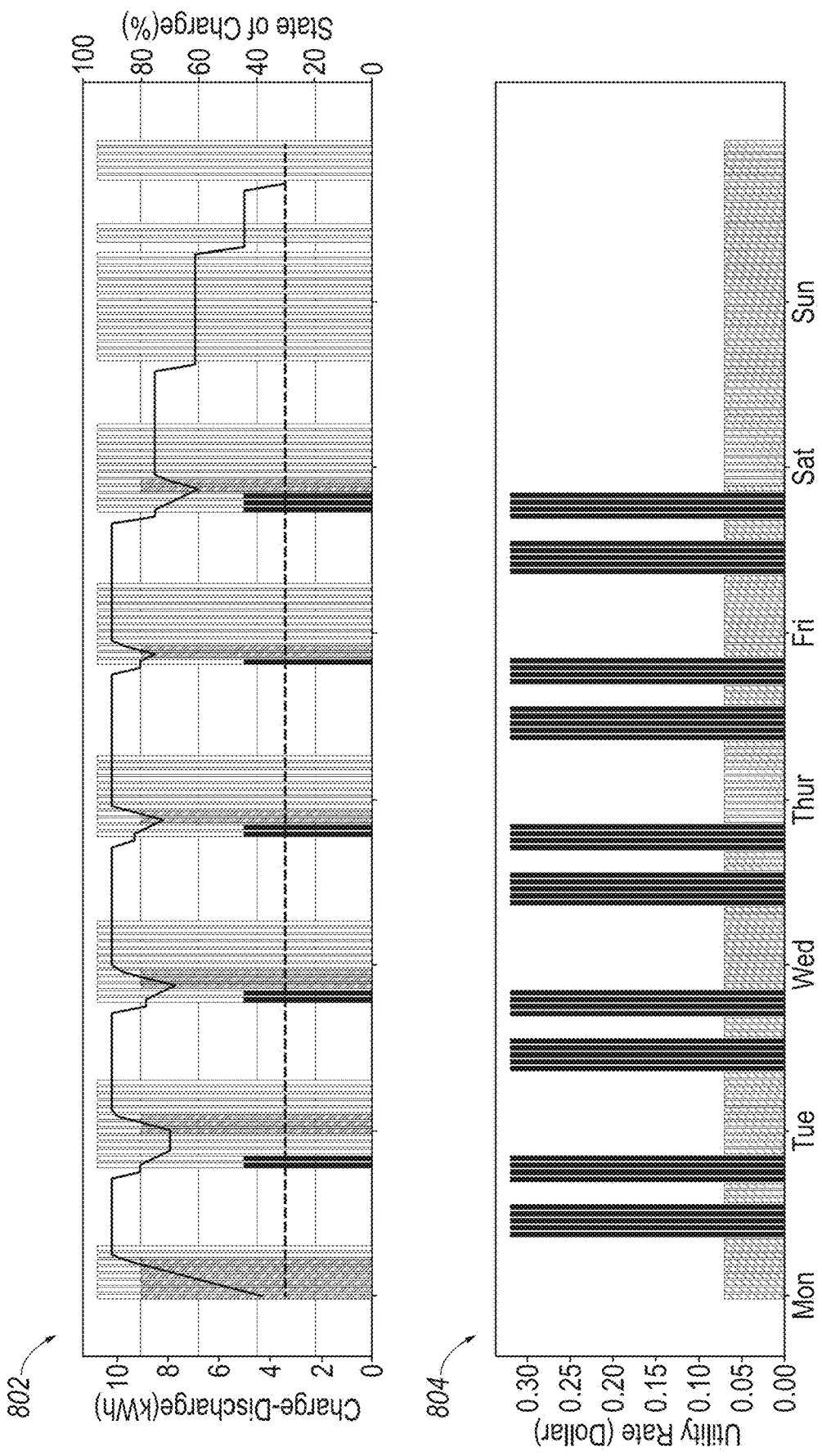

Referring to FIG. 8, bar charts 802, 804 of bi-directional energy transfer of the traction battery 124 of another example of the present disclosure are illustrated. The power transfer conditions of the present example are mostly the same as those discussed above with reference to FIG. 6, except that the grid requirement askes the user to refrain from charging the vehicle 112 between 9 PM until 11:59 PM on Monday (similar to the requirement in the example illustrated with reference to FIG. 5). Therefore, the HEMS 212 refrains from charging the vehicle during the designated time period in compliance with the grid requirement.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A home energy system comprising:
  one or more controllers programmed to, during a period,
    command a plurality of discharges of a traction battery of a vehicle to supply power to a utility grid,
    charge the traction battery one or more times between the discharges, and
    inhibit further discharge of the traction battery for a remainder of the period after a total amount of power already discharged from the traction battery exceeds a kWh amount that is greater than a kWh capacity of the traction battery.

2. The home energy system of claim 1, wherein the one or more controllers are further programmed to command discharge of the traction battery to transfer power to the utility grid provided that a utility price associated with the utility grid is greater than a value.

3. The home energy system of claim 1, wherein the one or more controllers are further programmed to command charge of the traction battery using power from the utility grid provided that a utility price associated with the utility grid is less than a value.

4. The home energy system of claim 1, wherein the one or more controllers are further programmed to receive input defining a length of the period.

5. The home energy system of claim 1, wherein the one or more controllers are further programmed to receive input defining the kWh amount.

6. The home energy system of claim 5, wherein the input is user input.

7. The home energy system of claim 1, wherein the one or more controllers are further programmed to receive utility data or weather data related to the period.

8. The home energy system of claim 7, wherein the kWh amount is based on the utility data or weather data.

9. A method comprising:
during a period,
commanding a plurality of discharges of a traction battery of a vehicle to supply power to a utility grid;
charging the traction battery one or more times between the discharges; and
inhibiting further discharge of the traction battery for a remainder of the period after a total amount of power already discharged from the traction battery exceeds a kWh amount greater than a kWh capacity of the traction battery.

10. The method of claim 9 further comprising commanding discharge of the traction battery to transfer power to the utility grid provided that a utility price associated with the utility grid is greater than a value.

11. The method of claim 9 further comprising commanding charge of the traction battery using power from the utility grid provided that a utility price associated with the utility grid is less than a value.

12. The method of claim 9 further comprising receiving input defining a length of the period.

13. The method of claim 9 further comprising receiving input defining the kWh amount.

* * * * *